Dec. 18, 1956        N. E. SPIESS, JR., ET AL        2,774,578
METHODS AND APPARATUS FOR WHIPPING FOOD PRODUCTS
Filed Sept. 24, 1952
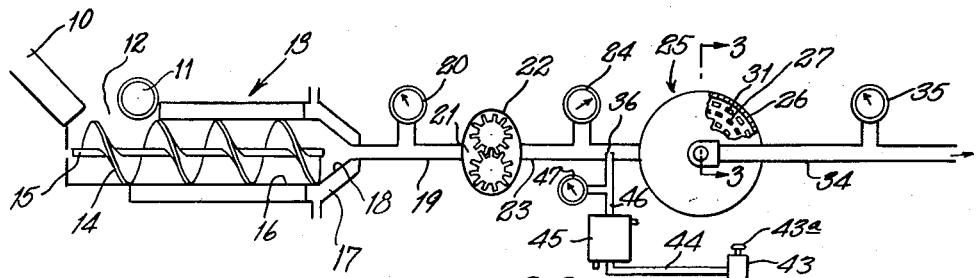
INVENTORS
NEWTON E. SPIESS JR.
EDWARD M. GROPEN
HENRY L. HENZE
BY Campbell, Brumbaugh, Free & Graves
ATTORNEYS

United States Patent Office 2,774,578
Patented Dec. 18, 1956

2,774,578

METHODS AND APPARATUS FOR WHIPPING FOOD PRODUCTS

Newton E. Spiess, Jr., Oakdale, Edward M. Gropen, East Northport, and Henry L. Henze, Oakdale, N. Y., assignors to National Dairy Research Laboratories, Inc., Oakdale, N. Y., a corporation of Delaware Application September 24, 1952, Serial No. 311,221

5 Claims. (Cl. 259—25)

This invention relates to methods and apparatus useful in the preparation of whipped products, particularly whipped products prepared from initially plastic or solid products such as butter and the like.

The incorporation of air or gas into products as by whipping often results in improved texture and appearance. In the case of food products, the palatability may also be improved. Not all products, however, lend themselves readily to standard whipping techniques and this is particularly true of solid products such as butter. A widely used method for whipping butter, for example, involves a two-stage beating sequence performed by conventional beaters of the type used by bakers, the open containers of which must be filled and emptied manually. The butter is first cut into pieces and placed in the beating machines which must be first operated at low speed to blend the butter and then at high speed to incorporate the necessary amounts of air. Since the butter under this beating method is constantly changing its air content, it will be apparent that the desired overrun value, i. e., the ratio of the volume of air to the volume of butter, obtains only instantaneously. Thus skill and care are required of the operator if the beater is to be stopped at the right moment. Also, the greatest care must be taken at all stages of the operation to avoid contamination. Furthermore, the total quantity of whipped butter which can be achieved is small in relation to the size or number of the beating machines required and the losses of butter due to spillage and residual waste on the surfaces of the containers and the beaters are relatively great.

Improved machinery, however, is available which provides a large and continuous through-put and which may be incorporated as part of a fully closed system relatively free of contamination. Such machinery has been most useful in whipping products which are in a relatively liquid state at the outset. Attempts to adapt such machinery for whipping relatively solid products such as butter have not been entirely successful because it has been extremely difficult, if not impossible, to achieve and maintain the desired volumetric ratio between the gas and the product. The volume of the gas introduced into the product tends to vary with the uncontrollable pressure variations within the system. Moreover, the volume of the product itself which is introduced into the system, tends to vary, and frequently troublesome cavitation occurs within the closed conduits and particularly in the pump.

It is accordingly one object of the invention to provide a new and improved system for preparing whipped products.

It is another object of the invention to provide a system for whipping relatively solid products whereby uniform characteristics of the whipped products may be readily attained.

Still another object of the invention is to provide an improved system for metering precise quantities of a gas into a product independently of pressure variations in the product.

A still further object of the invention is to provide an improved system for metering a plastic material into a conduit in constantly uniform amounts.

These and other objects and features may be attained in accordance with the present invention by providing a whipping system which is fully closed to the atmosphere between its input and output ends and which includes product metering, gas metering and whipping components. In accordance with the invention the product metering component may comprise a multiple pump system for achieving a constant volume flow into the whipping component including a first feed pump for introducing the relatively solid product under pressure into the input side of a second pump, which may be of positive displacement, continuous through-put type. The product moving from the second pump into a closed conduit will be substantially free of cavitation and will flow through the conduit in uniform quantities although its pressure may vary within certain limits.

The component for metering gas into the product moving through the conduit at high but varying pressures may comprise, in accordance with the present invention, an orifice communicating with the product in the conduit and means for establishing a pressure ratio across the orifice in the vicinity of 2:1 or greater. The quantities of gas introduced into the product will then be quite independent of the pressure of the product in the conduit. Thus in the case of butter whipping systems a constant overrun value may be readily achieved due to the cooperative action of the product and gas metering components.

From the conduit, the product to be whipped entraining the gas under pressure is fed into a closed whipping component having a continuous through-put and which will incorporate the gas into the product uniformly throughout by agitation.

The invention may be better understood by reference to the following specification describing one preferred embodiment thereof and taken in conjunction with the accompanying drawings in which Fig. 1 is a schematic diagram showing a system which is particularly adaptable for whipping solid products and showing the product metering, gas metering and whipping components.

Fig. 2 is a fragmentary view in longitudinal section showing part of the gas metering component;

Fig. 2A is an enlarged view of the end portion of the gas injection needle shown in Fig. 2; and Fig. 3 is a fragmentary view in vertical section taken on the line 3—3 of Fig. 1 and showing a whipping component.

Referring to Fig. 1, a continuous whipping system for a solid product such as butter is illustrated schematically as including a downwardly inclined feed chute 10 by means of which slabs of various lots of solid butter of a relatively low temperature, say 45° F., may be fed, via an input opening 12 and a constraining roller 11, into a preliminary pump or feed mechanism 13. This system makes possible the blending of slabs of butter selected from various lots in order to provide a uniform product having desired color, flavor and taste properties.

The preliminary pump 13, which comprises the first of a two-stage, constant volume pumping system for the butter, includes a non-positive displacement pump in the form of a feed screw 14 driven by a shaft 15 and received in a cylindrical chamber 16. From the preliminary pump 13 the butter is forced through a contracting section 18 into a conduit 19 fitted with a pressure gauge 20. Preferably, the preliminary pump 13 is provided with a water jacket 17 which may surround, for example, the contracting section 18 and through which warming water at approximately 95° F. may be circulated to assist in the movement of the butter through the mechanism, it being understood, however, that the water jacket does not materially raise the temperature of the butter mass but serves to provide lubrication at the points of engagement of the butter with the walls. Warm water may also be circulated through the feed screw 14.

The conduit 19 connects to the input side 21 of a positive displacement, continuously operable feed pump 22 which may be a gear pump, for example. The pump 22 receives the butter under pressures ranging from say 15 to 30 pounds per square inch from the preliminary pump 13 and discharges it into a conduit 23 at pressures ranging from say 50 to 120 pounds, depending upon the volume of whipped butter required. The conduit 23 is fitted with a pressure gauge 24. Also, useful results may be obtained by building up a relatively high pressure with the first pump and using the second pump as a metering device having, for example, a lower pressure at its outlet.

The conduit 23 leads to the input side of a whipping machine 25 as best seen in Fig. 3 which may comprise, for example, a shallow cylindrical housing 26, the parallel side walls of which carry a plurality of inwardly directed, stationary blades 27. Disposed centrally within the housing and driven by a shaft 28 is a rotor 29 comprising a central dividing partition 30 having a plurality of blades 31 extending outwardly therefrom in either direction among the opposed stationary blades. The solid butter enters the whipping machine 25 under pressure entraining measured quantities of gas at an inlet 23' close to the rotor shaft 28, from which point it moves outwardly in all directions radially of the shaft as indicated by the arrows 32 to be first agitated by the stationary and rotor blades 27 and 31 respectively, which are disposed to the left of the dividing partition 30 of the rotor. Near the periphery of the housing 26 the butter reverses its direction and moves back toward the axis of the rotor shaft on the right hand side of the partition 30 through a similar array of beater blades. The whipped butter converging toward the hub of the rotor is then passed out of the beater as indicated by the direction arrows 33 into an output conduit 34 which is preferably fitted with a pressure gauge 35. If desired, the housing 26 and stationary blades 27 of the whipping device 25 may be provided with a water jacket (not shown) for circulating warming water. This warming water may have an effect on the physical properties of the whipped product as well as serving to reduce the resistance to the flow of the product through the whipping machine.

Since the system as described above is closed between its input and output ends, the gas, such as air, which is incorporated in the butter if whipping is to result, must be introduced before the butter reaches the whipping machine 25. To this end a gas metering system shown schematically in Fig. 1 is provided. This system includes an orifice 36 disposed in the plastic product flowing in the input conduit 23 and connected to a source 37 of gas under pressure such, for example, as a compressor pump or a pressure tank, through a control system including a conduit 38, a pressure regulator or reducing valve 39, a conduit 40, a warming device 41 such as a water jacket, for example, a conduit 42, a flow meter 43, a throttling valve assembly 43a, a conduit 44, a second warming device 45 and a conduit 46 fitted with a pressure gauge 47. The warming devices 41 and 45 insure that the gas will be at a substantially fixed temperature as it flows through the throttling valve, flow meter and metering orifice.

Referring to Figs. 2 and 2A it will be seen that the orifice 36 through which the gas is introduced into the conduit 23 may be formed in a hollow needle 48 inserted into the conduit 23 through an opening 49 fitted with a rubber grommet 50. The needle 48 may be inserted and withdrawn through the grommet in accordance with well-known principles without creating pressure leaks in the conduit 23. The orifice should be disposed in the conduit so that it is immersed directly in the stream of the flowing product.

The hollow needle 48 is preferably carried by a rod slidably mounted in a bronze housing 52 fitted with suitable pressure seals 53 at either end to receive the rod 51. The rod 51 is closed at its free end and is formed with an opening 54 within the housing through which the gas, which enters the housing through the conduit 46, may be passed to the hollow needle 48. Preferably, the gas introducing assembly should be disposed as close as possible to the inlet of the whipping machine 25.

The pressure of the gas discharging at the orifice 36 into the conduit 23 is selected, in accordance with the invention, at a value at least twice the maximum pressure of the product in the conduit 23. It has been found that if a ratio of roughly 2 to 1 or greater is maintained between the gas pressure $P_2$ at the upstream side of the orifice and the pressure $P_1$ of the product on the downstream side of the orifice, that is $P_2 \geq 2P_1$, the gas velocity will be in the proper range of values and the mass of gas delivered to the product stream per unit of time will be constant for any fixed value of $P_2$, regardless of variations in $P_1$. Thus, with the pressure of the gas in the desired range, the mass of gas entering the conduit 23 through the orifice 36 will be constant and will be substantially independent of the pressure variations which will necessarily occur in the butter moving through the conduit 23. In this manner the amount of air which is metered into the butter may be closely controlled so that, in cooperation with the constant volume flow of butter into the whipping machine, a precise overrun value for the uniformly blended whipped butter emerging from the whipping machine 25 may be attained. From the whipping machine 25 the whipped butter may be passed directly into suitable packing stations (not shown) by means of the conduit 34.

It will be seen, therefore, that the invention provides a system for accurately metering a solid but plastic product into a conduit and also for accurately metering a gas into the product under pressure within the conduit. Cooperatively, these systems make possible the sanitary whipping of plastic products as a continuous operation which materially lowers the cost of production. It will be understood that the apparatus disclosed herein is for purposes of illustration and should not be thought of as limiting the invention in any way. Thus, for example, the infeed means 10 and 13 may be arranged to accommodate many different types of materials and if desired a number of solids may be easily blended together by feeding them in parallel streams into the first pumping means. Also, many types of closed whipping machines may be used and the system may be adapted for use with a wide variety of products. The invention should not, therefore, be thought of as limited except as defined in the accompanying claims.

We claim:

1. A closed system for providing a continuous output of a whipped plastic product, comprising pumping means including at least two stages for introducing the solid, unwhipped product into a conduit under pressure, said pumping means comprising a screw feed device and gear pump connected in series and establishing a substantially constant volume of flow in the conduit at varying pressures, means for introducing gas continuously into the product within the conduit including an orifice, means for providing a gas behind the orifice at a pressure which is at least twice the maximum pressure of the product within the conduit, and closed whipping means for receiving the product and the gas from the conduit and for agitating the same to incorporate the gas uniformly throughout the product in a continuous whipping operation.

2. In a system for metering plastic solids into a conduit in a predetermined and uniform rate of flow, first non-positive displacement pump means for receiving plastic solids and for working the same into a closed conduit at a raised pressure, a second positive displacement pump means for receiving solids from the closed conduit at a raised pressure, a discharge conduit for receiving the flow of the product from the positive displacement pump, means for metering a gas into the product comprising orifice means communicating with the product discharged from the second pump means, and means for establishing a pressure ratio across the orifice which is at least two to one, whereby the ratio of the mass of the gas to the mass of the product may be closely controlled and maintained.

3. In a butter whipping system, means for metering solid butter into a conduit at a substantially uniform rate of flow, including first pumping means comprising a screw-feed device, infeed means for moving solid butter into the screw-feed device, means defining a closed conduit for receiving the butter from the screw-feed device at a raised pressure, second pumping means comprising a gear pump connected to receive the butter from the closed conduit, a closed whipping machine connected to receive the flow of butter from the second pumping means, and means for introducing gas into the butter between the second pumping means and the whipping machine.

4. In a system as set forth in claim 3, the pressure of the butter which flows at a substantially uniform rate into the whipping machine varying over a range of values, said means for introducing gas into the butter comprising an orifice for communicating with the butter, and means for establishing a pressure ratio across the orifice at least two to one, whereby the mass of gas entering the butter will be independent of the pressures of the butter at the point of introduction, said constant flow rate for the butter and said uniform mass of gas affording a constant overrun value for the whipped butter.

5. In a system for whipping butter, means for feeding fixed quantities of various lots of butter in slabs into a conduit at a substantially uniform rate of flow, comprising a screw feed device and gear pump connected in series to afford a substantially constant volume of flow in the conduit at varying pressures, means for introducing gas continuously into the product within the conduit including an orifice, means for providing a gas behind the orifice at a pressure which is at least twice the maximum pressure of the product within the conduit, and closed whipping means for receiving the product and the gas from the conduit and for agitating the same to incorporate the gas uniformly throughout the product in a continuous whipping operation such that a uniformly blended whipped product results.

References Cited in the file of this patent

UNITED STATES PATENTS

| 149,135 | Knight | Mar. 31, 1874 |
| 1,148,508 | Gagnon | Aug. 3, 1915 |
| 1,670,593 | Miller | May 22, 1928 |
| 1,927,376 | Schrader et al. | Sept. 19, 1933 |
| 1,927,799 | Mann | Sept. 19, 1933 |
| 2,055,587 | Pigott | Sept. 29, 1936 |
| 2,250,295 | Coleman | July 22, 1941 |
| 2,524,999 | Schulerud | Oct. 10, 1950 |
| 2,549,311 | Hudson | Apr. 17, 1951 |
| 2,572,049 | Oakes | Oct. 23, 1951 |

FOREIGN PATENTS

| 446,268 | Germany | June 27, 1927 |